United States Patent [19]

Ab der Halden et al.

[11] 4,148,749

[45] Apr. 10, 1979

[54] REGENERATION OF METAL PROMOTED PLATINUM GROUP CATALYST BY SUPERHALOGENATING AT THE END OF A HYDROCARBON CONVERSION CYCLE

[75] Inventors: Charles Ab der Halden, Chaville; Marcellin Espeillac; Georges Szabo, both of Le Havre, all of France

[73] Assignee: Compagnie Francaise de Raffinage, France

[21] Appl. No.: 753,195

[22] Filed: Dec. 22, 1976

[30] Foreign Application Priority Data

Dec. 30, 1975 [FR] France ................................. 75 40128

[51] Int. Cl.² ........................ B01J 23/96; B01J 21/20; C10G 35/08; C07C 15/00
[52] U.S. Cl. .................................... 252/415; 208/140; 252/419; 260/668 A; 260/673.5
[58] Field of Search .............. 252/415, 419; 208/140; 260/673.5, 668

[56] References Cited

U.S. PATENT DOCUMENTS

| | | | |
|---|---|---|---|
| 3,117,076 | 1/1964 | Brennan et al. | 208/140 |
| 3,278,419 | 10/1966 | Coe et al. | 252/419 |
| 3,496,096 | 2/1970 | Kluksdahl | 252/419 |
| 3,537,980 | 11/1970 | Kluksdahl | 252/419 |
| 3,558,479 | 1/1971 | Jacobson | 252/419 |
| 3,625,860 | 12/1971 | Condrasky | 252/415 |
| 3,634,292 | 1/1972 | Hayes | 252/415 |
| 3,725,249 | 4/1973 | Vesely et al. | 252/418 |
| 3,835,063 | 9/1974 | Davis, Jr. et al. | 252/419 |
| 3,904,510 | 9/1975 | Sinfelt et al. | 208/140 |

FOREIGN PATENT DOCUMENTS

| | | | |
|---|---|---|---|
| 2245754 | 4/1975 | France | 252/415 |
| 1150972 | 5/1969 | United Kingdom | 252/415 |
| 1398086 | 6/1975 | United Kingdom | 252/416 |

*Primary Examiner*—Winston A. Douglas
*Assistant Examiner*—P. E. Konopka
*Attorney, Agent, or Firm*—Curtis, Morris & Safford

[57] ABSTRACT

Process for regenerating hydrocarbon conversion catalysts, particularly for reforming and isomerization, which comprises superhalogenating the deactivated catalysts, burning the accumulated coke in a controlled manner preferably in a series of steps at different temperatures and oxygen percentages with an oxygen containing gas stream; treating the combusted catalyst with a further gas stream containing oxygen and a halogen (preferably chlorine), and thereafter reducing the catalyst with hydrogen in the practical absence of oxygen.

38 Claims, 1 Drawing Figure

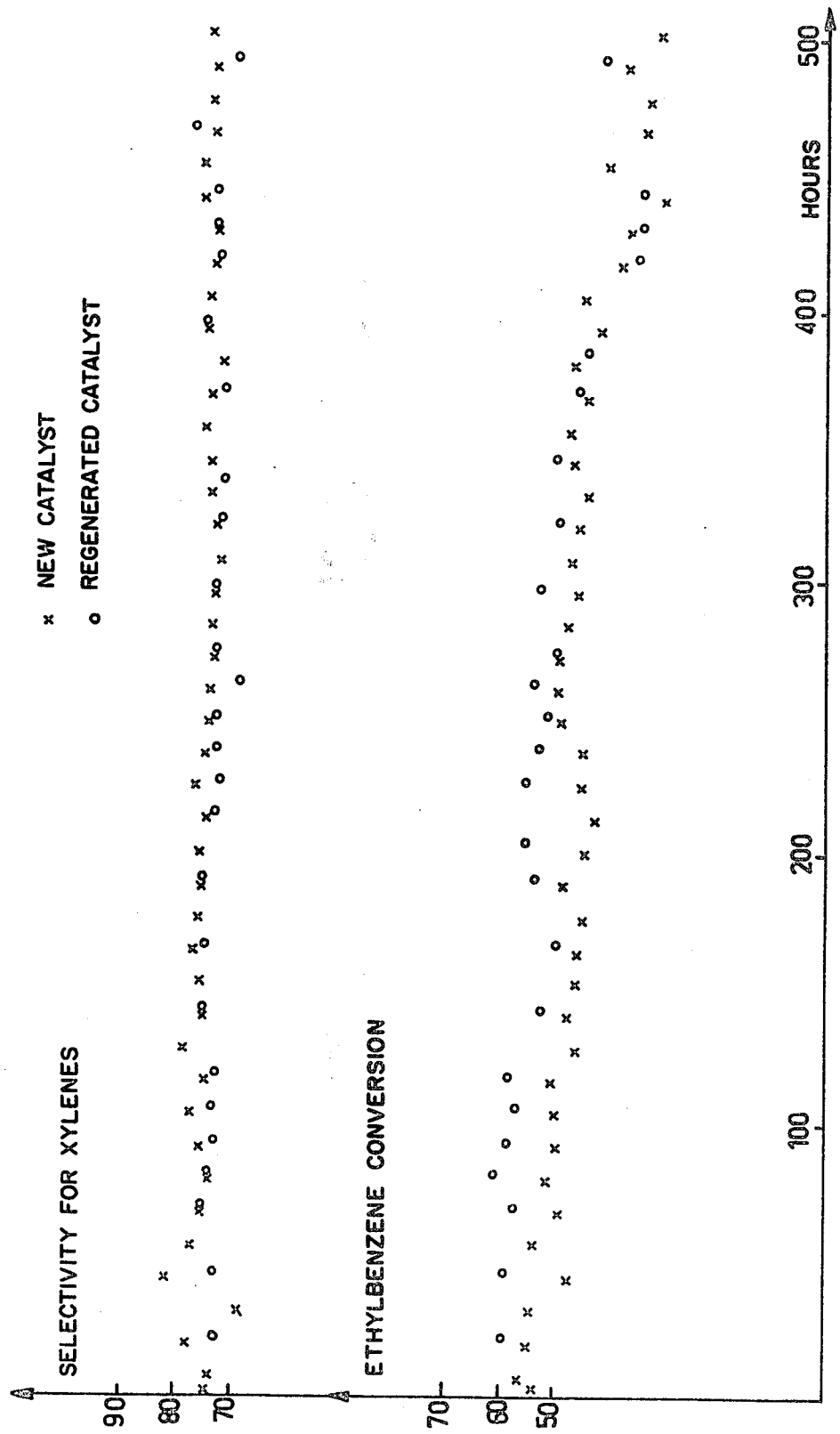

REGENERATION OF METAL PROMOTED PLATINUM GROUP CATALYST BY SUPERHALOGENATING AT THE END OF A HYDROCARBON CONVERSION CYCLE

The present invention relates to a process for the regeneration of hydrocarbon conversion catalysts which have become deactivated in the course of said conversion operation. It further relates to the application of said regeneration process to catalysts containing at least one platinum-group metal and possibly one or more additional metals, hereinafter called "promoters."

Hydrocarbon conversion processes are processes such as isomerization, hydroisomerization, hydrogenation, dehydrogenation, cyclization, dehydrocyclization, cracking, hydrocracking or reforming. In the course of the conversion operations in which the catalyst is employed, the latter's activity decreases in time. It will be recalled that the activity of a catalyst is a measure of its ability to convert the hydrocarbon charge to the desired products. In a reforming, cracking, or isomerization operation, for example, coke will deposit on the catalyst, thus rendering the active sites on the catalyst inaccessible. The drop in activity can be compensated for a time by raising the reaction temperature, but it may become necessary to regenerate the catalyst, since the temperature increase compensating for the drop in activity becomes too great and threatens to damage the catalyst or modify the conversion reactions initially desired.

The catalysts used in hydrocarbon conversion operations frequently contain a platinum-group metal, this term designating the following metals: Platinum, iridium, osmium, ruthenium, palladium, and rhodium.

Most often these metals are deposited by known impregnation techniques, by means of solutions containing them, on refractory carriers. The latter are generally formed of mineral oxides such as alumina or silicoaluminates. These carriers have a specific surface which may be as high as 500 $m^2/g$. The preferred carriers have a specific surface between 100 and 350 $m^2/g$. They have a pore volume greater than 0.1 cc/g, and generally approximately between 0.3 and 0.8 cc/g. Moreover, for certain conversion operations such as isomerization or reforming it is advantageous that they have acid sites, whether natural or brought about by immersing them in, or washing them with, a solution of an acid (such as hydrochloric acid or nitric acid).

The catalysts further contain a halogen, most often chlorine.

Many other metals may be added to the catalytic composition. The role of these promoters are usually to extend the life of the catalyst, and hence to put off the regeneration stage, by maintaining the activity of the catalyst at an appropriate level. These promoters may be selected from groups III to VII of the periodic table of the elements or also from among the rare earths.

When the deactivated catalyst is to be regenerated, the hydrocarbon feed may be stopped and the appropriate regeneration procedure followed, namely, "in situ" regeneration. Or all or part of the catalyst may be continuously discharged from the conversion reactor and the regeneration procedure may be carried out in a reactor provided for the purpose. This is "continuous" regeneration.

Many processes for the regeneration of deactivated catalysts have been studied and developed. They are carried out in a plurality of stages, the principal ones being:

Combustion of the coke deposited on the catalyst surface, by burning it off under a stream of oxygen diluted to a greater or less extent in an inert gas, such as nitrogen.

Oxyhalogenation, or oxidation in the presence of a substance susceptible of releasing a halogen, generally chlorine. This substance may be chlorine itself.

Possibly rehalogenation of the catalytic composition.

Reduction of the catalyst with hydrogen at the end of the combustion and oxidation operations.

These various stages using gases such as oxygen and hydrogen, which it is advisable to not mix, are all followed by purging with an inert gas such as nitrogen.

These processes give good results, because they restore the properties of the catalyst to the point where the performance of the regenerated catalyst is comparable to that of the new catalyst.

The purpose of the present invention is to propose a regeneration process that fits well into the conversion reaction.

It has occurred to the applicants to subject the deactivated catalyst to a superhalogenation when the condition of the catalyst (that is, its performance) calls for a regeneration (which may be effected either continuously or in situ), that is to say, when the "end of the cycle" has been reached. The cycle is the period of use of the catalyst in the conversion reactor between two successive regenerations.

The present invention thus has as its objective a regeneration process for hydrocarbon conversion catalysts which are at least partly deactivated. An embodiment of said process comprises the following stages:

1. Increasing the halogen content of the deactivated catalyst by treating it with a halogen and/or a compound susceptible of releasing halogen at the end of the cycle to give a superhalogenated deactivated catalyst.

2. Treatment of the superhalongenated deactivated catalyst with a gas stream containing oxygen.

3. Treatment of the catalyst with a gas stream containing oxygen and a halogen.

4. Reduction of the catalyst with a hydrogen stream.

The invention has as a further embodiment the application of the above regeneration process to a conversion catalyst comprising at least one platinum-group metal and at least one promoter deposited on a refractory mineral oxide carrier.

Further embodiments also include the process consisting essentially of the foregoing enumerated steps and/or their application to a catalyst consisting essentially of at least one platinum-group metal and at least one promoter deposited on a refractory mineral oxide carrier.

The process developed by the applicants permits reducing the overall duration of the regeneration and avoids continuous injection of halogen in a high proportion during the oxyhalogenation stage. It further permits maintaining a high halogen level on the catalyst throughout the regeneration by reason of the superhalogenation effected at the end of the previous cycle. In the case of "in situ" regeneration, this superhalogenation is carried out just before the end of the conversion operations, that is to say, during and/or just after the maneuvers for shutting down the unit. In the case of continuous regeneration, it is carried out in a reactor; while the conversion operations are taking place in the conversion reactor provided for this purpose. The process in accordance with the invention may therefore be practiced "in situ," that is to say, in the same reactor where the conversion is being carried out, or in reactors especially provided for this purpose, the catalyst then being discharged, continuously or discontinuously, from the conversion reactor.

Thus the cycle represents:

In the case of a discontinuous process (with regeneration in situ and/or in a reactor provided for the regeneration): The service period of the catalyst between two successive regeneration operations.

In the case of a continuous process (with regeneration in a reactor provided for the regeneration): The period between two successive regenerations for the same lot of catalyst (that is to say, the duration of the successive phases): start of the regeneration; end of the regeneration; transfer to, and use in, the conversion reactor; transfer into the regeneration reactor; and start of said regeneration; for a given catalyst lot.

The catalysts which may be regenerated by the process in accordance with the invention comprise at least one platinum-group metal, generally platinum itself, or platinum and iridium. The quantity of these metals is between 0.01 and 5 wt. %, and preferably between 0.1 and 0.7 wt. %, based on the total weight of the catalyst.

These catalysts may further comprise at least one promoter selected from groups III to VII, A and B, of the periodic table of the elements or from the group of rare earths. The quantity of promoter will be from 0.01 to 5 wt. %, and preferably from 0.01 to 1%, based on the total catalyst weight.

The applicants have found that the regeneration process is particularly well adapted to catalysts containing at least one platinum-group metal, at least one metal from group IVA (tin, germanium, lead) and possibly a third metal from groups III to VII of the periodic table of the elements, and especially to catalysts containing the following metals: Pt-Sn, Pt-Sn-Ge (or Re), Pt-Sn-Ga, Pt-Sn-Sc (or Y or Th or U or a rare earth), Pt-Sn-Cr, Pt-Sn-W, Pt-Sn-Mo, Pt-Sn-Mn, Pt-Ir-Sn, Pt-Sn-Ti, Pt-Sn-Zr, Pt-Sn-Cd and Pt-Sn-Si, and the same formulas in which germanium or lead is substituted for the tin.

In general, the catalysts contain (in wt. %):

From 0.01 to 5%, and preferably from 0.1 to 0.7%, of at least one platinum-group metal;

from 0.01 to 5%, and preferably from 0.05 to 1%, of at least one first promoter selected from the group consisting of tin, germanium and lead; and possibly from 0.01 to 5%, and preferably from 0.05 to 1%, of at least one second promoter selected from groups III to VII of the periodic table of the elements and the rare earths.

Such catalystic formulas are described, for example, in the following documents:

U.S. Pat. Nos. 3,700,588—3,888,061 and 3,822,221;
U.S. Pat. No. 3,830,726;
U.S. Pat. No. 3,974,097 and its continuation-in-part Ser. No. 690,908; and
U.S. Ser. Nos. 549,845; 597,987; 600,604; and 713,238.

The halogen present on the new catalyst then is preferably chlorine, in a proportion of from 0.1 to 10 wt. %, and preferably from 0.5 to 2 wt %, based on the total catalyst weight. For reforming operations, for example, the quantity of halogen (generally chlorine) is usually comprised between 0.7 and 1.2%, while for isomerization operation the halogen content is somewhat higher (approximately from 0.8 to 2%).

The refractory mineral oxide carrier is preferably an alumina having a specific surface ranging from 100 to 350 m$^2$/g and a pore volume greater than 0.1 cc/g, usually from 0.3 to 0.8 cc/g. The metals may be deposited on the carrier by any of the known techniques, such as impregnation, ion exchange, precipitation, etc.

When impregnation is used, it is preferable to deposit the element from group IVA before the platinum-group metal is deposited.

The mineral carriers such as alumina have acid sites whose magnitude may be modified by contacting the alumina with a solution of hydrochloric or nitric acid, for example.

These catalytic formulas are employed in hydrocarbon conversion reactions such as isomerization, reforming or aromatization. Examples of hydrocarbon charges which may be treated are aromatic hydrocarbons having eight or more carbon atoms, for isomerization; hydrocarbon charges whose boiling range is comprised between 30° and 250° C.—in other words, the naphtha range—, for reforming; and hydrocarbons having six or seven carbon atoms, for aromatization.

The operating conditions of these various processes are well known to the person skilled in the art.

The isomerization of alkylaromatic hydrocarbons, for example, is carried out at a temperature usually comprised between 350° and 500° C. and preferably between 430 and 480° C. and at a pressure on the order of 25 to 35 bars. The space velocity (vol./vol/hr.) of the hydrocarbon charge, determined in the liquid state, generally is in the neighborhood of 1 to 2, and the operation is performed in the presence of hydrogen, the molar ratio of hydrogen to hydrocarbons ranging between 8 and 10.

The aromatization of hydrocarbons having six or seven carbon atoms is carried out under more severe conditions, for example, at 500° to 600° C. and pressures ranging between 5 and 20 bars, the molar ratio of hydrogen to hydrocarbons generally being between 2 and 7.

Reforming, used to increase the octane number of hydrocarbon fractions, is carried out at a temperature of 400° to 600° C., and preferably from 450° to 550° C., and a space velocity between 0.5 and 10, and preferably from 1 to 5. The pressure generally is between 10 and 35 bars, and the molar ratio of hydrogen to hydrocarbons usually ranges between 2 and 10.

During all of these operations, the catalyst becomes deactivated in time. In the case of reforming, for example, this deactivation manifests itself in a drop in the octane number of the effluent from the unit. During the first few months of the cycle, this drop in octane number is compensated by an increase in the temperature in the reactors, and the trend of the temperature T as a function of time t may generally be represented by a curve the equation for which is $$T = T_o + kt,$$

where:

$T_o$ is the temperature at the start of the cycle, and k is a factor tied to the drop in activity of the catalyst with time; the lower the value of this constant, the better the behavior of the catalyst with time.

However, as pointed out earlier, in a discontinuous process it becomes difficult after a certain length of time to increase the temperature too much, for two reasons: The catalyst itself may then be destroyed, or the temperature may reach so high a level that the reactions which occur are radically modified. In particular, elevated temperature may promote cracking reactions which will result in the formation of coke on the catalyst, and this will merely raise the temperature still further while reducing the yield of the operation.

It then becomes necessary to regenerate the catalyst, and the process in accordance with the invention may be broken down as follows in the case of discontinuous regeneration:

At the "end of cycle," the reaction temperature is reduced at the rate of about 10° to 30° C. per hour until the temperature is about 350° to 450° C., and preferably about 400° C. During this stage where the temperature decreases, and when it has been decided to start the regeneration during the shutdown maneuvers, chlorine or a chlorinated product susceptible of releasing chlorine, such as the chloroalkanes or hydrogen chloride or chlorinated hydrocarbon derivatives are injected, under the above temperature conditions, with the hydrocarbon charge. The chlorine content of the charge is comprised between 0.0005 and 0.5 wt. %, and is preferably about 0.1 wt. % (for example, 0.08 wt. %), and in any case is such that by the end of this superchlorination stage an amount of chlorine equivalent to 0.5 to 1% of the total weight of the catalyst will have been added. The catalyst so superchlorinated then contains approximately 1.5 to 2 wt. % of chlorine, reforming operations usually being carried out over catalysts containing about 1% of chlorine.

When this objective has been attained, the hydrocarbon and halogen feed to the unit is shut off, if it has been decided to start regeneration during or before the maneuvers for shutting down the unit, and the unit is purged by known techniques, either by sweeping with an inert gas or through a series of successive pressurizations and depressurizations. This superchlorination stage may be carried out in a similar manner after the shutdown maneuvers, in which case halogen diluted with an inert gas, for example, is injected into the reactor.

The catalyst contains coke which has been deposited during the conversion and which must be burned off in the second stage, the combustion stage.

The latter is preferably carried out in several steps with gases containing oxygen in varying amounts. The gas may be air to which an inert gas such as nitrogen has been added.

The oxygen content of the gas for the primary combustion (first phase) is preferably maintained at less than 1% by volume with a view to avoiding an excessive temperature rise due to the exothermic combustion of the coke in the reactors. Usually it is preferred to maintain the oxygen content at about 0.5%. The temperature of this primary combustion phase is comprised between 400° and 450° C. The end of this first phase is marked by the appearance of oxygen in the effluent gas.

The secondary combustion (second phase) differs from the preceding one by the temperature and the oxygen content of the gas introduced into the reactor. The temperature here is progressively raised to between approximately 425 and 510° C., while the oxygen content is adjusted to about 2% and in any case is less than 3% by volume.

When the temperature reaches 510° C., the oxygen content is increased once more and the unit is stabilized for several hours at these conditions to complete combustion. Here the oxygen content is between 5 and 10% by volume and is preferably about 6%.

Upon completion of the combustion stage, the oxychlorination stage is carried out. The purpose of the latter is to disperse the platinum-group metal over the catalyst, because it may have agglomerated during the preceding cycle.

The gas injected into the reactors here contains from 5 to 10% by volume, and preferably about 6% by volume, of oxygen and a chlorinated product such as chlorine itself. It is necessary to inject halogen, because a portion of the halogen which was on the catalyst may have been entrained during the combustion stage. The chlorine content of the gases recycled to the reactor may, in this case, range, for example, between 10 and 100 ppmV (parts per million per volume) in the case of a reforming catalyst, and between 10 and 300 ppmV in the case of an isomerization catalyst. It is preferable also to inject water during this phase, the water content of the recycled gas being between 200 and 20,000 pmV. The chlorine content of the catalyst at the end of the combustion ($Cl_c$) may therefore be less than the chlorine content ($Cl_v$) intended for the catalyst, which, as pointed out earlier, is about 1% for reforming operations. It is therefore necessary to inject, during this oxychlorination stage, such quantity of chlorinated product that a quantity $Q_{Cl}=Cl_v-Cl_c$, expressed in percent of the total catalyst weight, may be deposited on the catalyst. The temperature of this stage is preferably comprised between 500° and 550° C.

The regeneration process in accordance with the invention is completed by a reduction with a reducing gas such as hydrogen, pure or diluted in an inert gas. Before this reduction, however, it is necessary to purge the entire unit until the oxygen content is low enough to eliminate all risk of accident, said content being usually fixed at 0.1% by volume. This reduction is carried out at between 250° and 600° C., and preferably at between 300° and 550° C. Its duration is only a few hours.

The process in accordance with the invention permits the complete restoration of the properties of the catalyst, and the performance of a regenerated catalyst therefore is entirely comparable to that of a new catalyst.

In the case of "continuous" regeneration, all or part of the partially deactivated catalyst is discharged from the conversion reactor into a so-called regeneration reactor. It will then suffice to follow the regeneration procedure described earlier, the massive injection of halogen into the regeneration reactor being made, for example, by means of a gas stream containing the halogen and an inert gas. The conversion reaction continues during this regeneration. (Hence the term "continuous.")

In the first two examples which follow, which are in no wise limitative, the performance in hydroreforming of a new catalyst and a catalyst regenerated in accordance with the process of the invention are compared. The performance of the catalysts there is represented by three equations:

(1) The equation which gives the hydrogen yield of the reforming operation as a function of the quantity of hydrocarbon charge passed over the catalyst, namely:

$$R_{H2}=A-k\,Q.$$

where:

$R_{H2}$ = hydrogen yield, in wt. %;
A = hydrogen yield at start;

Q = quantity of charge, in barrels of charge, passed per pound of catalyst; and k = proportionality constant. The higher it is, the more the hydrogen yield decreases with the quantity of charge passed (hence the catalyst is poorer).

(2) The equation which gives the liquid yield (hydrocarbons having five or more carbon atoms), $C_{5+}$, in wt. %, namely:

$$C_{5+} = B - k'Q,$$

where Q has the same meaning as above, B is the yield $C_{5+}$ at the start (Q=o), and k' is the proportionality constant. (The lower k', the better the catalyst.)

(3) The equation which gives the value of the temperature $T_t$, in °C., $$T_t = T_o + k'' Q,$$

where Q has the same meaning as above, $T_o$ is the temperature at the start, and k'' is the proportionality constant. (The smaller k'' is, the better is the catalyst.)

The examples relate to tests which have been run over a period of about 600 hours.

Example 3, which also is not limitative, illustrates the performance of a new or regenerated catalyst in the isomerization reaction of aromatic hydrocarbons having eight carbon atoms. The results of this example are shown in the accompanying single FIGURE.

EXAMPLE 1

This example is intended to compare the performance of a new catalyst and a catalyst regenerated in accordance with the process of the invention.

The catalyst used is a new catalyst containing platinum, tin and chlorine deposited by conventional techniques on an alumina whose characteristics are as follows:
Specific surface: 185 m²/gram
Pore volume: 0.48 cc/gram
Average pore radius: 52 Å
The catalyst has the following composition:
0.35 wt. % platinum,
0.20 wt. % tin, and
0.91 wt. % chlorine,
based on the total weight of the catalyst.

A catalytic reforming test is run with this catalyst under the following conditions:

| Charge | The charge treated is a naphtha of refinery origin which contains less than 1 ppm of sulfur and whose characteristics are: |
|---|---|
| Gravity | 0.728 |
| Initial point | 78° C. ⎫ distillation |
| End point | 142° C. ⎭ |
| Paraffin content | 66% by volume |
| Pressure | 19 bars |
| Space velocity | 1 (determined in the liquid state) |
| Molar ratio of hydrogen introduced to hydrocarbons introduced | 7.5 |
| Contemplated octane number | 98 |

At the end of this test of long duration (about 600 hours), the performance of the catalyst may be characterized by the equations giving the hydrogen yield ($R_{H2}$), the liquid yield ($C_{5+}$ fraction of effluent) ($C_{5+}$), and the transfer temperature ($T_t$) as a function of the quantity (Q) of charge passed over the catalyst.

For the above catalyst, the performance is given by the following equations:

$$R_{H2} \text{ (wt. \%)} = 2.45 - 0.07 \, Q$$

$$C_{5+} \text{(wt. \%)} = 82.6 - 0.90 \, Q$$

$$T_t (° C.) = 482.2 + 4.6 \, Q$$

At the end of the first cycle carried out with this catalyst, which then has the following composition by weight:
0.35% platinum,
0.20% tin,
1.28% chlorine, and
12.98% carbon,
the regeneration procedure is carried out on the basis of the following schedule:

(a) Superchlorination stage
   Duration: 4 hours
   Pressure: 10 bars
   Temperature: Decrease from 510° C. to 400° C. over 4 hours
   Chlorine content: 0.14 wt. % based on hydrocarbon charge (b) Primary combustion
   Duration: 40 hours
   Temperature: 425° C.
   Pressure: 10 bars
   Oxygen in gas: 0.55% by volume (c) Secondary combustion
   Duration: 12 hours
   Temperature: Raised from 425° to 510° C.
   Pressure: 10 bars
   Oxygen in gas: Raised from 0.55 to 6.5% by volume (d) Oxychlorination
   Duration: 10 hours
   Temperature: 510° C.
   Pressure: 7 bars
   Oxygen in gas: 7% by volume
   Water content: About 2000 ppmV
   Hydrogen chloride content of recycle gas: 50 ppmV (e) Reduction with hydrogen at 510° C. (about 10 hours)

At the end of this procedure, the regenerated catalyst contains 0.35% platinum, 0.20% tin, 0.85% chlorine and 0% carbon (all weight percent).

It is tested under the same conditions as the new catalyst, and its performance is characterized by the following equations:

$$R_{H2} \text{ (wt. \%)} = 2.52 - 0.08 \, Q$$

$$C_{5+} \text{(wt. \%)} = 83.3 - 1.25 \, Q$$

$$T_t (° C.) = 491.1 + 4.9 \, Q$$

These performance figures are on a par with those of the new catalyst. The properties of the catalyst thus have been well restored.

EXAMPLE 2

In this example, another lot of new catalyst of a composition identical to that of example 1 is used in a reforming reaction.

During the first cycle, the performance of the catalyst is characterized by the following equations:

$$R_{H_2} \text{ (wt. \%)} = 2.59 - 0.20\, Q$$

$$C_{5+} \text{ (wt. \%)} = 82.4 - 3.1\, Q$$

$$T_t \text{ (°C.)} = 494.5 + 4.9\, Q$$

At the end of the first cycle, the catalyst, whose composition is 0.35 wt. % platinum, 0.20 wt. % tin, 1.2 wt. % chlorine and 11.5 wt. % carbon, is subjected to the following regeneration procedure:

(a) Superchlorination
  Duration: 4 hours
  Temperature: Decrease from 510° to 400° C. over 4 hours
  Pressure: 10 bars
  Chlorine content: About 0.15% based on hydrocarbon charge
(b) Primary combustion
  Duration: 31 hours
  Temperature: 425° C.
  Pressure: 10 bars
  Oxygen in gases: 0.5% by volume
(c) Secondary combustion
  Duration: 10 hours
  Temperature: Raised from 425° to 510° C.
  Pressure: 10 bars
  Oxygen in gases: Raised from 0.50 to 6.20% by volume
(d) Oxychlorination
  Duration: 30 hours
  Temperature: 510° C.
  Pressure: 20 bars
  Oxygen in gases: 6.0% by volume
  Water content: About 2000 ppmV
  Hydrogen chloride content of recycle gas: 35 ppmV
(e) Reduction with hydrogen at about 510° C. for about 8 hours After regeneration, the catalyst contains 0% carbon, 0.35% platinum, 0.20% tin and 0.80% chlorine (all weight percent).

This regenerated catalyst is tested under the same conditions as the new catalyst. Its performance is characterized by the following equations:

$$R_{H_2} \text{ (wt. \%)} = 2.49 - 0.08\, Q$$

$$C_{5+} \text{ (wt. \%)} = 81.7 - 1.65\, Q$$

$$T_t \text{ (°C.)} = 489.4 + 4.5\, Q$$

Here, too, it is seen that the properties of the catalyst have been fully restored. Comparison of the coefficients of the equations in this example even shows that the regenerated catalyst has aged more slowly than the new catalyst, which has the advantage of extending the service cycle of the catalyst.

EXAMPLE 3

This example relates to the application of the regeneration process in accordance with the invention to a catalyst which contains platinum, tin and zirconium on an alumina carrier and which has been partially deactivated in the course of an isomerization reaction of aromatic hydrocarbons containing eight carbon atoms.

The new catalyst contains (in wt. %):

0.38% platinum
0.19% tin
0.15% zirconium
1.81% chlorine on an alumina whose characteristics are identical to those of the alumina used in the preceding examples.

The conditions of the catalytic test are as follows:
Temperature: 450° C.
Space velocity (determined in the liquid state): 2
Total pressure: 30 bars
Molar ratio of hydrogen to hydrocarbons: 5
Charge (wt. %): 23% ethylbenzene 55% metaxylene 22% orthoxylene The conversion of the ethylbenzene is defined by the ratio $$C\,(\%) = \frac{\text{ethylbenzene introduced} - \text{ethylene discharged}}{\text{ethylbenzene introduced}},$$

each of these terms being figures in wt. % based on the charge or on the effluent.

Similarly, the selectivity for xylenes is defined as the ratio $$S\,(\%) = \frac{\text{sum of xylenes discharged}}{\text{sum of } C_8 \text{ aromatics introduced}},$$

each of these quantities being expressed in weight percent of the charge or of the effluent.

A first test is performed on the new catalyst. The duration of this test is 720 hours. Through the injection of chlorine (about 10 ppm by volume) in accordance with the present invention at the end of this test, a deactivated catalyst is obtained which still contains a high proportion of chlorine. In fact, an analysis of the catalyst shows that it contains 1.69 wt. % of chlorine and 5.35 wt. % of carbon.

The sequence of the regeneration is as follows:
(a) Primary combustion
  Duration: 7 hours
  Temperature: 430° C.
  Pressure: 10 bars
  Oxygen: 0.50% by volume
(b) Secondary combustion
  Duration: 9 hours
  Temperature: Raised from 425° to 510° C.
  Pressure: 10 bars
  Oxygen: Raised from 0.50 to 6.2% by volume
(c) Oxychlorination
  Duration: 13 hours
  Temperature: 510° C.
  Pressure: 10 bars
  Oxygen: 6.2% by volume
  Water content: About 2000 ppmV
(d) Reduction with hydrogen at 510° C. (about 12 hours) After regeneration, the catalyst contains:
  0.38 wt. % platinum
  0.19 wt. % tin
  0.15 wt. % zirconium
  1.53 wt. % chlorine The regenerated catalyst is tested in the same manner as the new catalyst, the test duration being 660 hours.

The results of these two tests are shown in the single FIGURE, which gives the conversion of the ethylbenzene and the selectivity for xylenes. (x=new catalyst, 0=regenerated catalyst).

It is apparent from that FIGURE that the regeneration process in accordance with the present invention completely restores the activity of the catalyst.

We claim:

1. Regeneration process for a hydrocarbon conversion catalyst containing on a refractory mineral oxide carrier at least one platinum group metal and at least one group IVA metal as a promoter, which catalyst is functionally enhanced by added halogen and which has been at least partially deactivated by coke during the use of said catalyst in the conversion process, the conversion cycle ending with the separation of said catalyst from the conversion process for the purpose of regeneration, said regeneration process comprising the following successive steps:
   (a) increasing the halogen content of said catalyst by treating it in the absence of oxygen and in the presence of the charge for the hydrocarbon conversion process or of an inert gas, during about the end of said cycle or thereafter, with halogen and/or a halogen releasing compound to give a superhalogenated catalyst which has a substantial excess of halogen over the final halogen content of regenerated catalyst and which excess is sufficient to substantially reduce the duration and severity of halogen treatment in step (c);
   (b) treatment of the superhalogenated catalyst with a gas stream containing oxygen to burn off the deactivating coke at a rate which avoids excessive temperature which would damage the catalyst;
   (c) treatment of the catalyst with a gas stream containing oxygen, water, and a halogen and/or halogen releasing compound for a time and at a temperature and a halogen content of said latter gas stream which is sufficient to adjust the halogen content of said catalyst to that amount useful to restore the particular hydrocarbon conversion use for which said catalyst is designed, and also to redisperse the platinum group metal which may have become agglomerated during the preceding cycle;
   (d) reduction of the catalyst with a hydrogen-containing stream.

2. Process according to claim 1, whrein stage (b) is carried out in several phases.

3. Process according to claim 2, wherein in a first phase of stage (b) said gas stream contains less than 1% by volume of oxygen and the temperature is maintained at between 400° and 450° C.

4. Process according to claim 3, wherein stage (b) comprises a second phase in two steps:
   during the first step, the oxygen content of the gas introduced is maintained at less than 3% by volume, the temperature being progressively raised approximately from about 425° C. to about 510° C.; and
   during the second step, the temperature is maintained at about 510° C. and the oxygen content is increased from less than 3% by volume to a content comprised between 5 and 10% by volume.

5. Process according to claim 4, wherein in stage (c) the temperature is between 500° and 550° C. and the oxygen content of the injected gas is between 5 and 10% by volume.

6. Process according to claim 5, wherein stage (d) is brought to a temperature between 250° and 600° C.

7. Process according to claim 1, wherein during stage (a) the temperature is reduced reasonably slowly to about 350° to 450° C., in stage (b) the coke deactivating the catalyst is burned at a rate which avoids excessive temperature which would damage the catalyst, in step (c) the halogen content of said gas stream is sufficient to restore the halogen content of said catalyst to that content useful for the particular hydrocarbon conversion use for which said catalyst is designed, during stage (d) the temperature is between about 250° and 600° C. and any $O_2$ in said stream is below about 0.1 vol. %.

8. Process according to claim 7, wherein in stage (c) the temperature is between 500° and 550° C. and the oxygen content of the injected gas is between 5 and 10% by volume.

9. Process according to claim 8, wherein in a first phase of stage (b) said gas stream contains less than 1% by volume of oxygen and the temperature is maintained at between 400° and 450° C.; and in the second stage of stage (b) are two steps:
   during the first step, the oxygen content of the gas introduced is maintained at less than 3% by volume, the temperature being progressively raised approximately from about 425° C. to about 510° C.; and
   during the second step, the temperature is maintained at about 510° C. and the oxygen content is increased from less than 3% by volume to a content comprised between 5 and 10% by volume.

10. Process according to claim 6, wherein the temperature in stage (a) is reduced to about 400° C., the oxygen content in stage (c) is about 6%, and the temperature in stage (d) is between 300° and 550° C.

11. Process according to claim 6, wherein stage (a) adds an amount of chlorine equivalent to 0.5 to 1% of the total weight of the catalyst.

12. Process according to claim 11, wherein the halogen content of the gas stream in stage (c) is between 10 and 300 ppmV of chlorine.

13. Process according to claim 12, wherein the gas stream of stage (c) has a water content of between 200 and 20,000 ppmV.

14. Process according to claim 6, wherein said catalyst contains from 0.01 to 5 wt. % of at least one platinum-group metal.

15. Process according to claim 7, wherein said catalyst contains from 0.01 to 5 wt. %, of at least one platinum-group metal.

16. Process according to claim 14, wherein the promoter content of said catalyst is between 0.01 and 5 wt. %.

17. Process according to claim 15, wherein the promoter content of said catalyst is between 0.01 and 5 wt. %.

18. Process according to claim 6, wherein said catalyst comprises:
   from 0.01 to 5 wt. % of at least one platinum-group metal;
   from 0.01 to 5 wt. % of at least one promoter selected from the group consisting of tin, germanium and lead.

19. Process according to claim 7, wherein said catalyst comprises:
   from 0.01 to 5 wt. % of at least one platinum-group metal;
   from 0.01 to 5 wt. % of at least one promoter selected from the group consisting of tin, germanium and lead.

20. Process according to claim 7, wherein said catalyst comprises:

from 0.01 to 5 wt. % of at least one platinum-group metal;

from 0.01 to 5 wt. % of at least one first promoter selected from the group consisting of tin, germanium and lead; and from 0.01 to 5 wt. % of at least one second promoter selected from groups III to VII of the periodic table of the elements and from the rare earths.

21. Process according to claim 20, wherein said second promoter is selected from the group consisting of rhenium, gallium, scandium, thorium, yttrium, uranium, chromium, tungsten, molybdenum, manganese, titanium, zirconium, cadmium, lanthanum, cerium, praseodymium, neodymium, dysprosium, samarium, silicon and gadolinium.

22. Process according to claim 18, wherein the promoter is tin.

23. Process according to claim 1, wherein said hydrocarbon conversion comprises contacting a hydrocarbon charge with hydrogen, and wherein stage (a) is carried out prior to shutting down the conversion process at the end of said cycle.

24. Process according to claim 6, wherein said hydrocarbon conversion comprises contacting a hydrocarbon charge with hydrogen, and wherein stage (a) and the following stages are carried out during and/or after maneuvers for shutting down the conversion process at the end of the cycle.

25. Process according to claim 6, wherein said hydrocarbon conversion comprises contacting a hydrocarbon charge with hydrogen, and wherein all or part of said catalyst is drawn off continuously into a regeneration reactor.

26. Process according to claim 24, wherein said conversion is reforming.

27. Process according to claim 25, wherein said conversion is reforming.

28. Process according to claim 24, wherein said conversion is isomerization.

29. Process according to claim 25, wherein said conversion is isomerization.

30. Process according to claim 6, wherein said catalyst contains a platinum component which is the only platinum-group metal therein.

31. Process according to claim 8, wherein said catalyst contains a platinum component which is the only platinum-group metal therein.

32. Process according to claim 7, wherein said catalyst contains a platinum component which is the only platinum-group metal therein.

33. Process according to claim 24, wherein said catalyst contains a platinum component which is the only platinum-group metal therein.

34. Process according to claim 25, wherein said catalyst contains a platinum component which is the only platinum-group metal therein.

35. Process according to claim 22 further comprising a zirconium ingredient as a second promoter.

36. Process according to claim 1, wherein during stage (a) the temperature is reduced at a rate between 10° and 30° C. per hour to a temperature of between 350° and 450° C.

37. Regeneration process for a chlorinated platinum-containing hydrocarbon-reforming catalyst which is at least partially deactivated by coke, said process comprising:

(a) increasing the chlorine content of said catalyst by treating it in the absence of oxygen and in the presence of the charge for the reforming process or of an inert gas, at about the end of the reforming cycle or thereafter, with chlorine and/or a chlorine releasing compound, so as to result in said catalyst being superchlorinated with a chlorine content of 1.5 to 2 wt. %, said superchlorination treatment occurring between the hydroreforming temperature and down to about 350° C.;

(b) treatment of the superchlorinated catalyst with a gas stream containing oxygen in the following successive steps:

(1) wherein said gas stream contains less than 1% by volume of oxygen and the temperature is maintained at between 400° and 450° C. until about such time as oxygen appears in the effluent gas;

(2) wherein the oxygen content of the gas is increased but maintained at less than 3% by volume and the temperature is progressively raised approximately from 425° C. to about 510° C. and is thereafter stabilized at about the latter temperature for several hours while raising the oxygen content from less than 3% by volume to between 5 and 10% by volume, to complete the combustion of the coke;

(c) treatment of the catalyst with a gas stream containing oxygen and chlorine and/or a chlorine releasing compound at a temperature of between 500° and 550° C. and with the oxygen content of the injected gas being between 5 and 10% by volume with the treatment being for a period of time sufficient to restore the halogen content of said catalyst to the desired range of about between 0.7 and 1.2 wt. % and also for a time sufficient effectively to redisperse any platinum catalytic component which may have become agglomerated during the preceding reforming cycle and wherein this latter gas stream has a water content of between 200 and 20,000 ppmV;

(d) reduction of the catalyst with a hydrogen-containing stream at a temperature of about 250° and 600° C. with any oxygen content of said latter stream being less than about 0.1% by volume to be low enough to avoid risk of explosion;

said catalyst comprising a refractory mineral oxide carrier and a specific surface ranging from 100 to 350 m²/g and a pore volume greater than 0.1 cc/g on which is deposited from 0.01 to 5 wt. % of platinum and from 0.01 to 5 wt. % of at least one first promoter selected from the group consisting of tin, germanium, and lead and with combined chlorine of an amount from 0.7 to 1.2 wt. %.

38. A process according to claim 37 wherein said catalyst consists essentially of only the specified components and additionally, as a second promoter, from 0.01 to 5 wt. % of zirconium; wherein said refractory mineral oxide carrier is alumina; and wherein during stage (a) the temperature is reduced at a rate between 10° and 30° C. per hour to a temperature of between 350° and 450° C.

* * * * *